(12) United States Patent
Iaia et al.

(10) Patent No.: US 12,487,302 B2
(45) Date of Patent: Dec. 2, 2025

(54) MRI APPARATUS WITH IMPROVED THERMAL CONTROL SYSTEM AND METHOD FOR OPERATING SAID THERMAL CONTROL SYSTEM

(71) Applicant: Esaote S.p.A., Genoa (IT)

(72) Inventors: Paolo Iaia, Genoa (IT); Vincenzo Punzo, San Giorgio a Cremano (IT); Giuseppe Salvo, Genoa (IT)

(73) Assignee: ESAOTE S.p.A., Genoa (IT)

( * ) Notice: Subject to any disclaimer, the term of this patent is extended or adjusted under 35 U.S.C. 154(b) by 121 days.

(21) Appl. No.: 18/413,758

(22) Filed: Jan. 16, 2024

(65) Prior Publication Data
US 2024/0241198 A1 Jul. 18, 2024

(30) Foreign Application Priority Data
Jan. 17, 2023 (EP) .................................... 23151884

(51) Int. Cl.
 *G01R 33/38* (2006.01)
 *G01R 33/383* (2006.01)
 *G01R 33/389* (2006.01)
(52) U.S. Cl.
 CPC ....... *G01R 33/3804* (2013.01); *G01R 33/383* (2013.01); *G01R 33/389* (2013.01)
(58) Field of Classification Search
 CPC .......... G01R 33/3804; G01R 33/383; G01R 33/389; G01R 33/3806
 See application file for complete search history.

(56) References Cited

U.S. PATENT DOCUMENTS

| 6,297,634 B1 * | 10/2001 | Aoki | G01R 33/383 324/318 |
| 2007/0290685 A1 * | 12/2007 | He | G01R 33/383 324/318 |
| 2009/0140735 A1 * | 6/2009 | Chen | G01R 33/385 324/318 |

FOREIGN PATENT DOCUMENTS

| CN | 212675149 U | * | 3/2021 |
| EP | 1004270 A1 | | 5/2000 |
| GB | 2512328 A | | 10/2014 |

OTHER PUBLICATIONS

Machine translation of CN-212675149-U (Year: 2021).*
(Continued)

*Primary Examiner* — G.M. A Hyder
(74) *Attorney, Agent, or Firm* — BUCHANAN INGERSOLL & ROONEY PC

(57) ABSTRACT

An MRI apparatus with an enhanced thermal control system, the apparatus including:
 a static magnetic field generation unit with at least two magnetic poles at a predetermined distance and forming a gantry for housing an object to be imaged;
 one heater for heating the magnetic poles and/or the magnetic yoke;
 one or more temperature sensors measuring the temperature of the at least one pole and/or of the yoke;
 a thermal control unit, including:
 a processing unit, with control software;
 the processing unit having input ports for receiving temperature measurement signals from the one or more temperature sensors;
 the processing unit having output ports for feeding driving signals to the one heater;
 the control software including instructions to generate the driving signals of the one heater.

22 Claims, 8 Drawing Sheets

(56) References Cited

OTHER PUBLICATIONS

"MRI sequence", Wikipedia, retrieved Jan. 16, 2024 from https://en.wikipedia.org/wiki/MRI_sequence.
"Proportional-integral-derivative controller", Wikipedia, retrieved from https://en.wikipedia.org/wiki/Proportional%E2%80%93integral%E2%80%93derivative_controller.
European Search Report mailed on Jun. 28, 2023 by the European Patent Office for corresponding Application No. EP23151884.6. (8 pages).

* cited by examiner

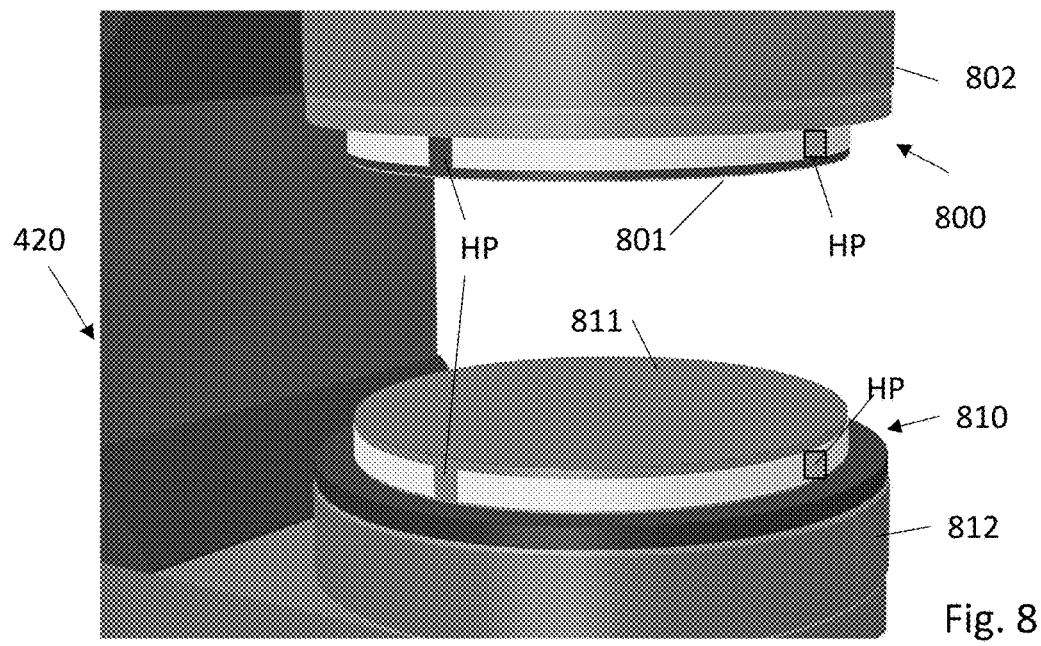
Fig. 8
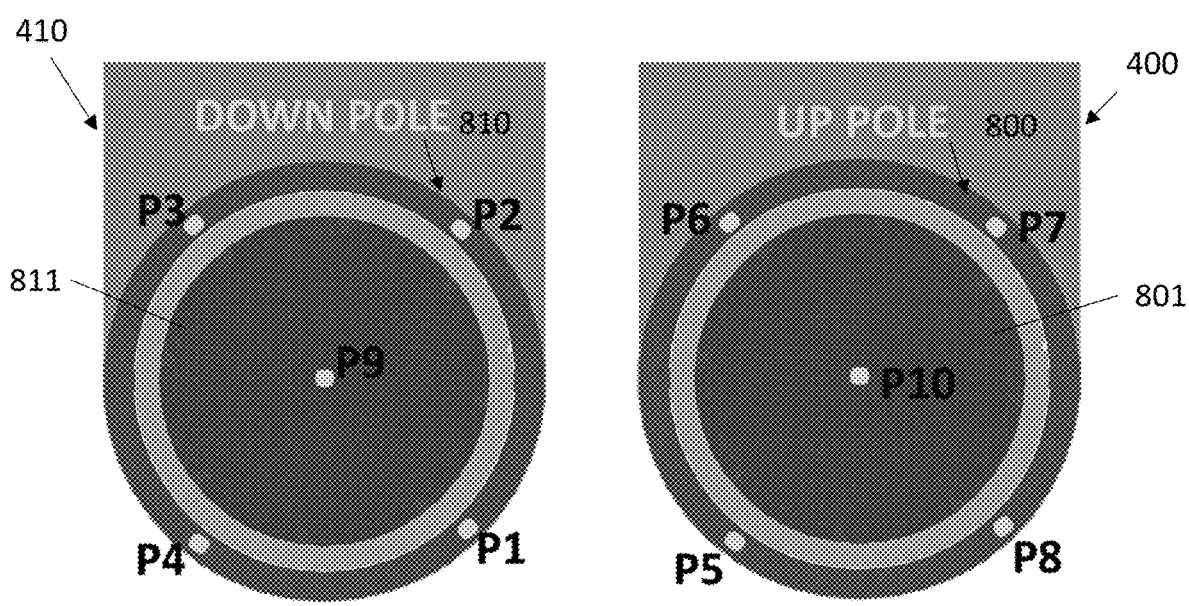
Fig. 9
Fig. 10

MRI APPARATUS WITH IMPROVED THERMAL CONTROL SYSTEM AND METHOD FOR OPERATING SAID THERMAL CONTROL SYSTEM

BACKGROUND

The invention relates to an MRI apparatus with an enhanced thermal control system, the said apparatus comprising:
a static magnetic field generation unit with at least two magnetic poles supported one opposed to the other at a predetermined distance by a yoke and forming between them a gantry for housing an object to be imaged;
at least one heater for heating the said magnetic poles and/or the said magnetic yoke;
one or more temperature sensors measuring the temperature of the at least one pole and/or of the yoke;
a thermal control unit, comprising:
  a processing unit, with a memory in which a control software is loaded or loadable, the said control software being executed or executable by the said processing unit;
  said processing unit having input ports for receiving the temperature measurement signals from the said one or more temperature sensors;
  said processing unit having output ports for feeding driving signals to the said at least one heater;
  the said control software comprising the instructions for configuring the said processing unit to generate the said driving signals of the said at least one heater as a function of the signals related to measured temperatures by the said one or more sensors.

Such kind of thermal control systems in MRI apparatuses is known.

The thermal control of the static magnetic field generation unit, generally at least one magnetic pole, normally two opposed magnetic poles between which a gap is provided and which magnetic poles are supported by a joke is a critical point in relation to the quality of the acquired image. The relatively long lasting of image acquisition by MRI, particularly in the case of low and mid field apparatuses and also particularly when the magnetic field source is made by permanent magnets has as a drawback that generation structure of the said static field magnetic, namely pole or poles and joke may be affected by a temperature drift. This drift may relate to a temperature increase or a temperature decrease and thus a consequence to a corresponding variation of the strength of the generated static magnetic field.

Furthermore, the variations of the temperature of the structure generating the static magnetic field are not homogeneous along the mass of the constructive parts forming the structure generating the static magnetic field, as the yoke or the poles. There is a relation between the dimensions of the so called imaging volume, which is a space permeated by the static magnetic field and in which the object to be imaged has to be placed and the dimensions of the magnetic structure generating the static magnetic field, particularly the poles and the yoke. These constructive parts, normally have dimensions bigger than the corresponding dimensions of the imaging volume and this can be a further cause of having nonhomogeneous or uniform temperatures within the mass of material forming the yoke and or the poles. This could cause the generation of temporary or transient inhomogeneities of the static magnetic field.

As a further fact, the MRI apparatus is also provided with so called gradient coils which are associated to the poles and which generates magnetic fields having a variable intensity along a specific spatial direction in such a way as to be able to code the RF signals generated by the spin echoes so that a univocal spatial relation can be determined between received echoes and their origin, in particular the spatial position of their origin.

Gradient coils may also influence the temperature of the magnetic field generation structure causing global and/or local heating effects such as the ones described above.

Known thermal control methods in MRI apparatuses provides the heating of the magnetic structure considered, as a whole, up to a predetermined operational temperature which for example could be about 30° ° C. to 35° C. The control process is directed to maintain such a temperature which is usually higher than the ambient temperature in which the apparatus is placed. No distinction is made by initial heating, meaning the heating process at the start up of the apparatus and/or the beginning of an imaging session and the thermal control during the imaging process for compensating fluctuations of the temperature of the magnetic structure due to the activation in particular of the gradient coils.

This thermal control is defined in the present description and in the claims as steady state thermal control or steady state thermal control phase.

Although data relating to measurement of temperature at different places of the structure generating the static magnetic field are considered the said data are used for generating common driving signals of the heaters.

OBJECTS AND SUMMARY

An object of the present invention consists in providing an MRI apparatus with a thermal control, system having higher precision in the control of the temperature of the structure generating the static magnetic field and having a higher precision in compensating the thermal fluctuations of the structure generating the static magnetic introduced by thermal effects induced by associated units such as the gradient coils.

A further object of the present invention consists in providing an MRI apparatus having a thermal control system which can consider also local temperature fluctuations at the structure generating the static magnetic field in order to provide for a more homogenous temperature distribution within the mass of the material forming the said structure for generating the static magnetic field.

A further object of the present invention is to provide a method for carrying out thermal control of the structure generating the static magnetic field in an MRI apparatus, which method allows to obtain higher precision in the control of the temperature of the structure generating the static magnetic field and provides also a higher precision in compensating the thermal fluctuations of the structure e generating the static magnetic introduced by thermal effects induced by associated units such as the gradient coils.

A further object of the present invention relates to a method for providing a thermal control of an MRI apparatus which method is able to consider also local temperature fluctuations at the structure generating the static magnetic field in order to provide for a more homogenous temperature distribution within the mass of the material forming the said structure for generating the static magnetic field.

Further objects will appear more clearly from the following disclosure.

SUMMARY OF THE INVENTION

According to the above objects a first embodiment of the present invention relates to an MRI apparatus with an enhanced thermal control system, the said apparatus comprising:
- a static magnetic field generation unit with at least two magnetic poles supported one opposed to the other at a predetermined distance by a yoke and forming a gantry for housing an object to be imaged;
- at least one heater for heating the said magnetic poles and/or the said magnetic yoke;
- one or more temperature sensors measuring the temperature of the at least one pole and/or of the yoke;
- a thermal control unit, comprising:
- a processing unit, with a memory in which a control software is loaded or loadable, the said control software being executed or executable by the said processing unit;
- said processing unit having input ports for receiving the temperature measurement signals from the said one or more temperature sensors;
- said processing unit having output ports for feeding driving signals to the said at least one heater;
- the said control software comprising the instructions for configuring the said processing unit to generate the said driving signals of the said at least one heater as a function of the signals relating to the measured temperature by the said one or more sensors, and in which one or more temperature sensors are associated to each of the poles and to the yoke;
- one or more heaters are associated and in thermal contact to each of the poles and to the yoke,
- in the said control software, the instructions being coded for configuring the said processing unit to carry out two different control phases:
- a first yoke heating phase for heating the yoke at a predetermined working temperature of the yoke;
- a second pole/poles temperature control phase which is started upon reaching of the said working temperature of the yoke by the first yoke heating phase and which second phase provides the driving of the heaters associated to the pole/poles till a predetermined working temperature of the said pole/poles has been reached;
- the said second pole/poles temperature control phase being carried out continuously or steadily during the execution of image acquisitions by the MRI apparatus, while the said yoke heaters are deactivated;
- the said yoke heaters being reactivated if the yoke temperature drops below the said yoke working temperature and till the yoke working temperature has been reestablished.

It is clear that the above disclosed thermal control system is provided in combination with the usual operational units associated to a structure for generating a static magnetic field in an MRI apparatus.

Without any limiting effect and only for completeness sake, the MRI apparatus is provided in combination with structure for generating the static magnetic field with gradient coils for generating the spin echoes coding magnetic fields, a coil for transmitting to the body under examination RF excitation pulses of the spin resonance effect, a coil for receiving RF pulses related to the magnetic resonance echoes, a transmission signal and a receipt signal processing unit and optionally also further units related to compensations of electromagnetic and/or magnetic noise fields such as electromagnetic shields and/or magnetic noise field compensation coils and the associates magnetic sensors, the processing unit of the signals provided by the said sensors and compensation coils drivers.

Further units and/o additional devices may be provided in the MRI apparatus and in combination with the structure generating the static magnetic field such as patient tables, receiving coils particularly designed for specific anatomical districts devices for inoculating contrast agents and others known at the state of the art.

The present MRI apparatus is preferably a, so called, permanent magnet MRI apparatus in which the magnetic field is generated by magnetized material.

Typically, one or more layers of one or more different permanently magnetized materials are formed on supporting surfaces of a yoke and are combined with one or more layers of non-permanently magnetized material.

A typical magnetic structure comprises a yoke supporting at a certain distance one from the other layers of permanently magnetized material and layers of non-permanently magnetized materials forming two opposite magnetic poles. A static magnetic field directed from one pole to the other permeates the gap between the said poles and the said gap forming the space for housing an object to be imaged.

According to a further feature, during the said second temperature control phase only the heaters associated to the poles are controlled and activated for reaching and maintaining the said predetermined working temperature of the said poles,
- while the said yoke heaters are deactivated and are reactivated only if the yoke temperature drops below the said working temperature of the yoke and till the yoke temperature has reached again the said yoke working temperature.

According to a further feature which can be combined with one or more of the features described above, the heaters in thermal contact with the yoke are so called fast heaters.

According to an embodiment, with the term fast heaters, one or more heaters are intended which are provided in such a number and combination of single heating power that a global heating power of the yoke is generated from 1000 to 3000 W, and especially from 1500 to 1800 W.

The heaters for the second phase thermal control of the pole/poles are provided in such a number and kind, particularly individual output heating power that a global heating power of the pole/s is generated from 300 to 1000 W, especially from 500 to 600 W.

According to a further feature which can be provided in any combination with one or more of the preceding features and embodiments, the yoke is provided with certain number of heaters distributed over the surface of the said yoke and in thermal contact with it at different zones or points of the said surface of the yoke.

According to a further feature which also can be provided in any combination with the features of the embodiments described above, the yoke is provided with a certain number of temperature sensors distributed at different places over the surface of the yoke and in thermal contact with it at different zones or points of the yoke.

Similarly, and in any combination with the features of the above disclosed embodiments, also the pole/s are provided with a certain number of heaters which are distributed along the pole surface at different zones or points of the said pole/poles.

According to a variant embodiment, each pole may be in the form of a plate having, on one side of the said pole facing an opposite pole/s, a surface with the largest dimensions relatively to other sides of the pole and having lateral surfaces along the perimeter of the said side with a surface with the largest dimensions, and the said heaters are secured, in thermal contact therewith, to the said lateral surfaces of the said pole, preferably with a homogenous distribution along the said lateral surfaces.

According to still a further embodiment, each pole is provided in combination with a certain number of temperature sensors, which are distributed along the surfaces of the corresponding pole.

When the structure for generating the static magnetic field is provided with a symmetric construction of the poles according to a certain kind of symmetry, the distribution of the heaters and/or of the temperature sensors is also set following the said symmetry concerning the position of each individual heater and/or each individual temperature sensor relatively to the shape of the said structure for generating the static magnetic field.

In one preferred embodiment, the poles facing each other and forming opposite sides of a gantry for housing an object to be imaged are symmetric in relation to a common axis of rotational symmetry which axis is parallel to the direction of the static magnetic field and corresponds to the central axis incident at each of the larger surfaces of the said poles which faces each other, and the distribution of the heaters and/or of the temperature sensors associated to the each of the said poles is also rotationally symmetric in relation to the said rotational symmetry axis.

According to a further feature which can be provided in combination to the above feature, the distribution of the heaters and of the temperature sensors associated to each pole relatively to the opposite pole is also symmetrical in relation to a plane perpendicular to the said axis of rotational symmetry and which is also parallel to the largest surfaces of the said poles.

Considering a yoke having a shape which is symmetrical in relation to a plane of symmetry which is a plane being perpendicular to the said axis of rotational symmetry of the poles and which is also parallel to the largest surfaces of the said poles, such as a so called "C" shaped yokes, the distribution of the heaters and/or of the temperature sensors associated to the yoke are symmetrical with respect to the said plane of symmetry.

According to a further feature, when at least a layer of permanently magnetized material is supported by the yoke for each of the said two poles, at least one of the temperature sensors associated to the said yoke is provided near the said layer of permanently magnetized material of the corresponding pole and the output signals related to the corresponding temperature at the yoke measured by the said temperature sensors is also processed by the processing unit during the above mentioned second, steady state, thermal control phase, in combination with the output signals of the temperature sensors associated and in thermal control with the poles.

In combination with any of the above disclosed features of the MRI apparatus according to the present invention, a further feature may consist in the fact that each of the said temperature sensors associated to the poles and optionally the at least temperature sensors associated to the yoke in a position nearest to the permanently magnetized material, are fed to the processing unit and the control software executed by the processing unit comprises the instructions for configuring the said processing unit to be able to generate output driving signals for driving the corresponding heaters associated to the poles according to a PID control function.

A proportional-integral-derivative controller (PID controller or three-term controller) is a control loop mechanism employing feedback that is widely used in industrial control systems and a variety of other applications requiring continuously modulated control. A PID controller continuously calculates an error value $\Delta Ei$ as the difference between a desired setpoint (SP), here the desired working temperature of the pole/s and a measured process variable (PV), here the measured temperatures of the pole/poles, and applies a correction based on proportional, integral, and derivative terms (denoted P, I, and D respectively), hence the name.

More details on the general theory of the PID controller and the PID control process can be found for example at https://en.wikipedia.org/wiki/PID controller.

According to an embodiment which can be provided in combination with one or more of the preceding embodiments, the said control software loaded and executed by the said processing unit comprises the instructions for configuring the said processing unit to carrying out recursively the following steps:

the said temperature sensors associated to the poles and optionally the ones associated to the yoke measure the relative temperature differences at different zones of the said poles and at the yoke with respect to the reference temperature being the working temperature of the poles;

the processing unit transforms the said temperature differences in correlated variations of the heat power to be supply to each of the heaters in order to minimize the said temperature differences;

the said transformation measured from the measured temperature differences in the said power variations of the heating power to be fed to the heaters is carried out by calculating the said power variations for each heater as the function of the said temperature differences measured by the said temperature sensors and of the PID main parameters being: the proportional constant KPi, the derivative constant KDi and the integrative constant KIi and the channel weights ωi according to the following equation:

$$\Delta Pj = f(\Delta Ei, \omega i, KPi, KDi, KIi).$$

Obviously, a change in the PID and weights parameters changes the thermal control of the system and its response to the thermal fluctuations generated during the MRI scan acquisition by the gradient coils Joule effect.

According to a first variant embodiment, the processing unit can be provided with a processing channel for each temperature sensor and with an output channel for each heater and the PID controller carry out the PID control process independently for each of the said temperature sensors and each of the heaters associated to the pole/poles and optionally considering also the temperature measured at the yoke by a temperature sensor at the yoke surface at a zone of point of the yoke which is nearest to the layer of the permanently magnetized material associated to each pole.

According to an improvement the number of processing channels could be reduced by combining to a single processing channel a subgroup of temperature sensors and/or of heaters of the total number of temperature sensors and of the total number of heaters which are associated to the joke and to the pole/poles.

A criterium for grouping could consist in using similarity in the positioning of the sensors and/or heaters in relation to the geometry of the poles and/or of the yoke and similarities in a relative position of the poles one to the other and of the corresponding parts of the yoke supporting the said poles.

According to the above feature, a certain number i of input channels of the signals coming from different subgroups of temperature sensors which is smaller than the total number of temperature sensors is obtained.

Similarly a certain number j of output channels of the driving power of the heaters is provided each corresponding to a different subgroups of heaters is provided which number of output channels j is smaller than the total number of heaters.

In combination to the above, the processing unit is configured to receive separately, optionally by multiplexing, the signals generated by each temperature sensor and to calculate the measured temperature value to be fed to the i-th processing channel of the PID controller by averaging the temperature measured by each of the temperature sensors being part of the corresponding subgroup of temperature sensors related to the said i-th channel.

Specific details on the above features are disclosed in the following detailed description of preferred embodiments of the present invention.

According to the objects disclosed above the present invention relates also to a method for operating a thermal control of an MRI apparatus comprising a static magnetic field generation unit with at least two magnetic poles supported opposed to the other at a predetermined distance by a joke and forming a gantry for housing an object to be imaged, the said method comprising the following steps:

carrying out a fast heating step of the yoke for heating the said yoke to a predetermined working temperature of the yoke;

controlling the heating of the said yoke by measuring the effective temperature of the yoke and stopping the said heating of the yoke when the measured temperature of yoke corresponds to the said predetermined working temperature of the yoke;

carrying out a following thermal control phase of the pole/poles by monitoring the temperature only of the pole/s and optionally of at least one limited region of the yoke and heating the said poles till the pole/s have reached a predetermined working temperature of the poles;

continuously controlling during operation of the MRI apparatus the heating of the said pole/s by measuring the effective temperature of the pole/s, for maintaining the said working temperature of the pole/poles;

the said heating being controlled by means of a PID control process.

According to a further feature, during the said second temperature control phase only the heaters associated to the pole/s are controlled and activated for reaching and maintaining the said predetermined working temperature of the said pole/s, while the heating of the yoke is stopped and is restarted only if the yoke temperature drops below the said working temperature of the yoke.

According to a further feature, during the said second temperature control phase further to the temperature measured at the pole/poles also the temperature measured at, at least one zone or point of the yoke is used for carrying out the PID control process the driving signals of the heaters associated to the pole/poles being calculated by the said PID control process as a function of the temperatures measured at the pole/poles and also at the said at least one zone or point of the yoke.

According to an embodiment, each pole is associated to at least one layer of permanently magnetized material which is supported also by the yoke and the said temperature measured at, at least one zone or point of the yoke is measured at a zone or point of the yoke which is nearest to the said layer of permanently magnetized material.

According to a further feature which can be combined with one or more of the features described above, the heaters in thermal contact with the yoke are so called fast heaters.

According to an embodiment, with the term fast heaters, heaters are intended which are provided in such a number and with such individual heating power that a global heating power of the yoke is generated from 1000 to 3000 W, and especially from 1500 to 1800 W.

In an embodiment, the heaters for the second phase thermal control are provided in such a number and with such an individual heating power that a global heating power of the pole/s is generated from 300 to 1000 W, especially from 500 to 600 W.

According to a further feature the temperature of the yoke and/or of the poles is measured at a predetermined number of different zones or points of the said yoke and/or poles.

According to still a further feature which can be provided in combination of the above feature, the yoke and/or the poles are heated at a predetermined number of different zones or points of the said yoke or poles, preferably at different zones or points at which the temperature is measured.

In an embodiment of the above described method according to any one of the disclosed variants and/or features, each of the said measured temperature values at each of the said points or zones or a combination of the said measured values of a certain sub group of the said zones or points at the poles and optionally at the yoke are processed by a separate channel of a PID control loop which generates an output channels for setting the heating power to be fed to each of the said zones or points at the poles or to a subgroup for the said zones or points at the poles.

According to an embodiment which can be provided in combination with one or more of the preceding embodiments, the said thermal control is configured to carry out recursively the following steps:

one or more temperature sensors associated to the poles and optionally the ones associated to the yoke measure the relative temperature differences at different zones or points of the said poles and at the yoke with respect to the reference temperature being the working temperature of the poles;

a processing unit transforms the said temperature differences in correlated variations of the heat power to be supply to each of the heaters in order to minimize the said temperature differences;

the transformation from the measured temperature differences in the said power variations of the heating power to be fed to the heaters is carried out by calculating the said power variations for each heater as the function of the said temperature differences and of the PID main parameters being: the proportional constant KPi, the derivative constant KDi and the integrative constant KIi and the channel weights ωi according to the following equation:

$$\Delta Pj = f(\Delta Ei, \omega i, KPi, KDi, KIi).$$

Obviously, a change in the PID and weights parameters changes the thermal control of the system and its response to the thermal fluctuations generated during the MRI scan acquisition by the gradient coils Joule effect.

In relation to the above disclosed MRI apparatus and to the above disclosed method for thermal control, according to an embodiment which can be provided in any combination with the one or more of the embodiments or features of the MRI apparatus and of the method describe above, the working temperature of the yoke is lower than the working temperature of the pole poles.

MRI imaging can be carried out by applying so called scanning sequences. A so called MRI Imaging sequence is a particular setting of pulse sequences and pulsed field gradients. Every sequence cause a different resulting image, in a particular image appearance. There are a great number of different imaging sequences. A certain number of these sequences is disclosed in the document published at the page https://en.wikipedia.org/wiki/MRI_sequence.

Imaging sequences may be combined together for being executed during an imaging session and the said combination of sequences is called multiparametric MRI optionally further including other specialized MRI configurations such as spectroscopy.

Imaging sequences generates sequence specific joule heat which adds to the heating effects disclosed above.

Since the energy applied in a sequence vary in time also the heating effect due to Joule heat is not constant during an MRI imaging with a specific sequence.

This has the effect that the above Kpi, KDi and Kit values considered constants in first approximation are indeed parameters variable in relation to time as indicated by the notation:

$$\omega i = \omega i(t); Kpi = Kpi(t); KDi = KDi(t)\ e\ KIi = KIi(t).$$

The functions $\omega i(t)$; $Kpi(t)$; $KDi(t)$ e $KIi(t)$ can be parametrized functions or specific matrices of values which can be updated by an AI algorithm executed by the system.

According to an embodiment an AI-algorithm, such as a machine learning algorithm as for example a neural network or any other kind of network can be used for generating the said matrices of values.

In a possible variant embodiment, the machine learning algorithm is trained on a big set of imaging protocols each one related to the execution of imaging using a certain combination of imaging sequences.

The training of the machine learning algorithm has the object to teach to the machine learning algorithm the thermodynamic behavior of the MRI apparatus depending on the applied imaging sequence or imaging protocol intended to be used in an imaging session and thus the said machine learning algorithm causes a run-time modification of the PID parameters $\omega i$, $KPi$, $KDi$, $Kii$ in a way corresponding to the applied sequence/sequences and the correction $\Delta Pj$ is calculated by the PID function using the said updated parameters $\omega i$, $KPi$, $KDi$, $Kii$ as a consequence of the thermal energy provided by the different imaging sequences.

This embodiment which can be provided alternatively, i.e. alone and/or in combination with one or more of the above discloses embodiments, variations and or features, provide for the following advantages:

1. The AI can be trained on different MRI devices which at the design level ideally have the same non-linear thermodynamic behavior but which in reality show small differences in the 'response' to the external 'thermal' stresses produced by the Joule effect.
2. The AI is continuously updated during its use by learning from its "history" (i.e. from the specific use of the MRI apparatus, specific protocols used by an MRI technician). This minimizes and tends to make the thermodynamic behavior of the thermal control optimized on the specific MRI technician.
3. The AI trained in this way can quickly intercept malfunctions of the thermal control system, avoiding significant thermal drifts and consequent long and costly "machine shutdowns".

BRIEF DESCRIPTION OF THE DRAWINGS

FIGS. 4 to 10 represents a shape of the structure which could have a structure as the one schematically shown in FIG. 1, namely of a so-called C-shaped magnetic structure.

DETAILED DESCRIPTION

Figure 1:
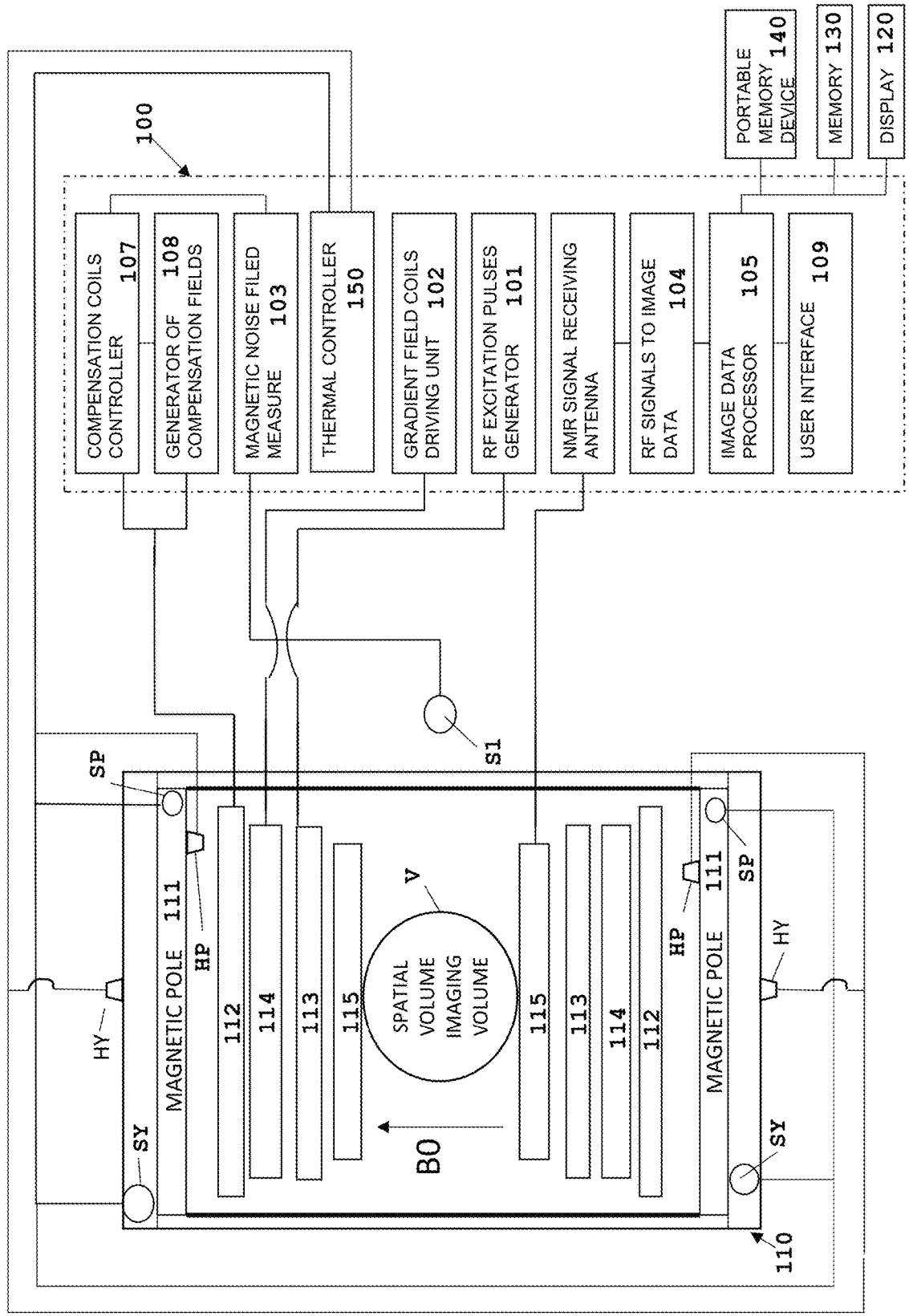
FIG. 1 shows a scheme of an embodiment of an MRI apparatus according to an embodiment the present invention.

FIG. 1 describes an embodiment of a generic MRI apparatus. A dashed line and the numeral 100 denote the control and processing electronics of a Magnetic Resonance imaging apparatus, whereas the blocks included therein are additional functional units, or have functions accomplished by appropriately programmed or controlled units of the Magnetic Resonance imaging apparatus.

These control and processing electronics drive the magnetic structure of the MRI system comprising a magnet structure for generating a static magnetic field BO within a cavity at least partially delimited by the magnet and within an imaging volume V in said cavity.

The Magnetic Resonance imaging apparatus includes static magnetic field BO generators, which are denoted with numeral 111.

These static magnetic field sources can be superconductive coils, resistive coils permanent magnets, or combinations thereof.

Without any limiting intention in a preferred embodiment the static field magnetic sources are one or more layers of permanently magnetized material. This layer or these layers are combined with a plate or a combination of plates of a non-permanently magnetized material forming a so-called magnetic pole. In FIG. 1, the structure is simplified by considering the layer or the layers of permanently magnetized material and the layers or plates of non-permanently magnetized material as a unique part indicated as magnetic pole and by the numeral 111.

Furthermore, without any limiting purpose the structure for generating the magnetic field compromises a yoke 110 for closing the magnetic circuit, which yoke has also the function of supporting the pole or the poles. In the present embodiment and as a non limiting example, the magnet structure for generating the static magnetic field BO is of the so-called "C" form, comprising two opposite magnetic poles supported by two opposed terminal brackets of the yoke 111 at a predetermined distance one form the other forming a gantry for accommodating a body under examination, or a part thereof between the two poles. The static magnetic field permeates the space between the said two opposed poles.

Control electronics of the static magnetic field generator are not illustrated in detail since it is part of the common general knowledge of the skilled person.

Furthermore, the magnet structure of the MRI apparatus comprises at least one magnetic noise field compensation coil 112 for generating inside the cavity and the imaging volume V a magnetic noise compensation field which neutralizes at least partially the effect of the magnetic noise fields on the static magnetic field BO.

The system further comprises at least one exciting pulse transmission coil 113 for transmitting to the body under examination one or more sequences of RF pulses for NMR excitation which coil is controlled by a RF excitation pulse generator 101.

The magnet structure comprises magnetic gradient fields generating coils 114 for generating during scanning, a magnetic field with a predetermined variation along each of three spatial directions (x, y, z) having the function of univocally encoding the nuclear spins and thus allowing to relate the NMR signal contributions of the RF signals received by the RF antenna 115 to a position in space for reconstructing an image. The magnetic gradient fields generating coils 114 are driven by a gradient field coils driving unit 102.

The RF NMR signals are processed by a processing unit converting the RF data into image data indicated by 104 and to an image generation unit 105. The reconstructed images can be displayed on a display 120 or stored in memories 130 which can be alternatively or in combination internal memories of the MRI apparatus or memories residing in an external storage device or a server or in a cloud. Optionally the images can be stored in portable memory devices 140 such as CD rom, DVD rom CD RAM, DVD RAM, memory sticks, portable hard disks, or similar devices.

A user interface 109 providing alternatively or in combination different user input devices is provided. The user interface may be alternatively or in combination a graphical user interface, a vocal user interface, a keyboard, a mouse or a similar device, a input port of command strings which has been generated by a remote device.

One or more probes indicated in a generic way and globally by S1 and distributed over the said static magnetic field BO generating structure, are connected to the input of a processing unit 103 for determining characteristic parameters of the magnetic noise field outside the cavity V of the Magnetic Resonance imaging apparatus and this characteristic data is fed to a compensation coils controller 107.

According to an embodiment, the compensation coils controller 107 is provided with a processor unit configured to calculate from theoretical or empiric functions the characteristic parameters of the magnetic noise field inside the cavity from the characteristic parameters of the noise field outside the cavity. The processor unit of the compensation coils controller is also configured to determine the magnetic noise compensation field to be generated inside the cavity for neutralizing the magnetic noise field inside said cavity. This magnetic noise compensation field is determined as a function of the characteristic parameters describing the magnetic noise field inside said cavity which has been determined from the measured characteristic parameters of the magnetic noise field outside the cavity.

The compensation coil controller 107 controls a compensation field generator 108 which provides the driving power signals for feeding the compensation coils 112.

Along the surfaces or optionally in recesses or chambers within the material forming the yoke and the poles 110, 111, to the said yoke and to the said poles there are associated at different zones or at different points of the said yoke and poles a certain number of temperature sensors which are globally indicated by SY for the temperature sensors of the yoke and SP for the temperature sensors of the poles. In an analogous way, along the surfaces or optionally in recesses or chambers within the material forming the yoke and the poles 110, 111, to the said yoke and to the said poles there are associated at different zones or at different points of the said yoke and poles, non-coinciding with the zones or the points at which the temperature sensors are provided, a certain number of heaters which are globally indicated by HY for the heaters of the yoke and HP for the heaters of the poles.

The output of each of the said temperature sensors SY and SP are connected to inputs of a thermal controller 150. The thermal controller 150 generates the driving signals for driving each one of the said heaters HY and HP as a function of the difference between a desired working temperature of the yoke and of the poles which is saved in the thermal controller as a reference value of the said working temperatures and the measured temperatures the thermal controller having an output for the said driving signals to which each of the said heaters is connected.

According to the present embodiment the thermal controller is a so called PID controller and carry out a PID control process as disclosed in the following embodiments.

According to an embodiment the control electronics of the MRI apparatus can be entirely or at least in part in the in the form of software units, consisting of programs for controlling programmable hardware of the Magnetic Resonance imaging apparatus, such as a PC or a central processing and control unit. Optionally the control electronics of the MRI apparatus can be entirely or in part dedicated hardware in which the functional logic is incorporated in the hardware.

The compensation coils 112, already resident in the Magnetic Resonance imaging apparatus, are adapted to compensate for substantially uniform and homogeneous static field fluctuations, induced by outside magnetic fields, in the imaging cavity V. Nevertheless, some fluctuations may show some spatial variability within the cavity, i.e., spatial non homogeneities. In this case, by suitably controlling gradient coils 114, compensation generated for these field fields may be also fluctuations, induced by noise fields, which have non-uniformities and non-homogeneities in space.

The thermal control system comprising the one or more heaters and the one or more temperature sensors and the thermal controller are dedicated to heating the yoke and the poles to a selected working temperature and to maintain the said working temperature of the yoke and of the poles.

Figure 2:
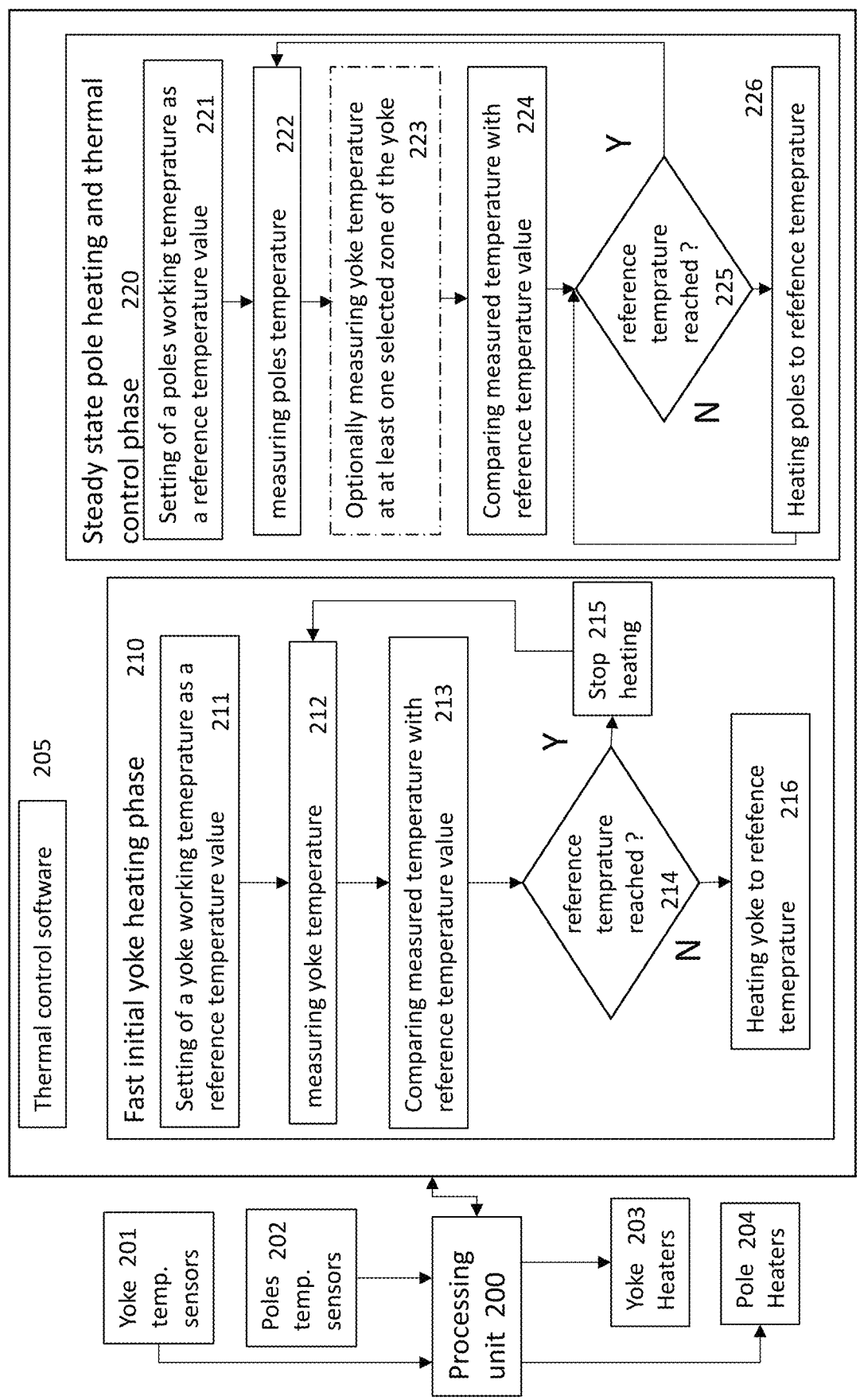
FIG. 2 is a high lever flux diagram showing the main generic principle of the thermal control according to the present invention.

FIG. 2 is a high lever flux diagram showing the main generic principle of the thermal control according to the present invention.

Two kinds of thermal control phases are provided and are carried out by the thermal controller 150.

The thermal controller being provided with at least a memory for saving a thermal control software in which the instructions are coded for configuring a processing unit of the thermal controller to carry out the steps of the thermal control process.

According to the shown embodiment, the thermal controller comprises a generic processing hardware in the form of a processing unit 200. The processing unit 200 comprises at least a CPU, a memory 205, peripherals such as input and output ports for each of the temperature sensors associated to the poles and to the yoke indicated respectively by 201 and 202 and for each of the heaters associated to the poles and to the yoke and indicated by 203 and 204.

In the following description each of the temperature sensors will be further indicated by an index i and each of the heaters by an index j as will, be described with more details in the following. The indexes i and j may indicate respectively individual temperature sensors and individual heaters of the plurality of temperature sensors and the plurality of heaters associated to the poles and to the yoke.

As shown in FIG. 2, in the memory 205 a thermal control software which is executed by the CPU of the processing unit 200 is saved and may be loaded in the working memory for execution.

The thermal control software comprises the instructions for carrying out the thermal control process of the structure of generating the static magnetic field according to two thermal control phases indicated respectively by 210 and 220 and consisting of a fast initial yoke heating phase and of a following steady state or continuous pole heating and thermal control phase. The instructions coded in the thermal control software and related to the said fast yoke heating phase 210 renders the CPU able to carry out the following steps:

A starting step 211 of setting a yoke working temperature as a reference temperature value by inputting and saving the said working temperature value in the memory 205 of the processing unit 200. This can be done only once or every time the MRI apparatus is restarted for carrying out imaging sessions.

Following the reference temperature setting step 211 a yoke temperature measuring step 212 is carried out and the measured temperature is compared with the set reference temperature at step 213. Till the measured temperature is not identical within a predetermined tolerance with the measured temperature of the yoke, as indicated by the box 214, the heating of the yoke is continued as indicated in step 215. When the measured temperature corresponds to the set reference temperature for the working temperature of the yoke, the heating process is stopped as indicated by the box 216.

The monitoring of the yoke temperature at step 212 may be continued in order to verify if the during the following thermal control phase the yoke temperature drops below the set reference temperature.

Only in this case the heating of the yoke will be restarted alternatively or in parallel to the thermal control phase of the poles 220.

When step 216 of the yoke heating phase 210 has been reached, the second and following steady state or continuous pole heating and thermal control phase 220 is started. In a previous step indicated by step 221 a reference temperature for the working temperature of the poles is selected, inputted and saved in the memory 205. This step can be carried out in a thermal control setting phase which is executed prior to executing the said yoke heating phase and the following poles heating and thermal control phase 210, 220. Alternatively, as shown here the said reference temperature for the working temperature of the poles can be set at the beginning of the said following heating and thermal control phase 220 of the poles As indicated by step 221.

In step 222 the temperature of the poles is measured by each of the temperature sensors 201 associated to the poles and the measured temperatures are compared to the set reference temperature for the working temperature of the poles.

In an embodiment which is a preferred one, but not limiting one, the working temperature of the poles is higher than the working temperature of the yoke.

In an embodiment both temperatures are higher than normal ambient temperatures and in the range between 30° C. and 40° C.

The measured temperatures are compared to the said reference temperature at step 224 and if the measured temperatures are not identical to the set reference temperature for the working temperature of the poles, as indicated at step 225 and 226 the heating of the poles is carried out by providing driving the heaters 204 of the poles only, while the heaters 203 of the yoke are not active or shut off.

Heating step 226 of the poles is carried out continuously by varying the driving power of the heaters of the pole as a function of the difference between measured temperatures and set reference temperature for the working temperature of the poles.

This second thermal control phase is carried out steadily and also during the driving of the MRI apparatus in an imaging session.

As it will describe with more details in relation to a specific embodiment, the control process can be carried out separately for each temperature sensor 202 associated to the poles and for each heater associated to the pole.

Thanks to this arrangement, being the temperature sensors and the heaters 202 and 204 provided at different zones or points of the poles the thermal control of the said poles can be carried out separately for different parts or zones of the said poles.

According to an embodiment, the processing unit may be provided for a separate processing channel for each temperature sensor of the one associated at least to the pole and a separate driving output for each of the heaters associated at least to the poles.

According to a further variant and optional embodiment, also the signals relating to the measured temperature of one or some of the temperature sensors 201 associated to the yoke may be used for calculating the driving signals of the heaters 204 and thus the thermal power produced and transferred by the said heaters to the poles. This is represented in FIG. 2 by the box 223 having a non-continuous frame.

In a variant embodiment a lower number of parallel processing channels may be provided and the measured temperature signals of each of the temperature sensors may be fed to the processing channels by multiplexing.

Different processing channels may be provided also for the temperature sensors 201 and for the heaters 203 associated to the yoke during the said fast yoke heating phase 210.

As it will become apparent with more details with the help of a particular embodiments, the signals of a group of temperature sensors associated to the poles may be combined together in order to limit the number of processing channels. The choice of the temperature sensors 202 which measurement signals has to be combined can be made according to different criteria.

A preferred criteria is to combine the signals relating to the temperature measurements of some of the temperature sensors which are located in a certain zone or region of the poles and or the yoke.

The poles and/or the yoke are subdivided in regions for example according to the geometrical shape and or to functional considerations in relation to the generation of the static magnetic field and the temperature sensors of each of the said zones are combine together.

The combination of the measured data of the said temperature sensors grouped in a certain selected region of the pole and/or of the yoke may be carried out according to several different ways, for example by calculating an average temperature value from the measured temperature values of each of the said temperature sensors forming part of a group.

In the case of this alternative and preferred embodiment the index i indicates the different groups of temperature sensors and the number of processing channel is reduced.

In a similar way also the output channels of the heaters of the poles and/or of the yoke can be grouped together, in order to drive a certain number of heater grouped together according to certain predetermined criteria using a unique driving signal identical for all heaters and causing each heater of the group do transfer an identical heating power to the pole and/or to the yoke.

As it will become apparent in the following in certain specific cases the grouped temperature sensors may consist in the combination of a certain number of temperature sensors of the pole and at least one of the temperature sensors of the yoke.

Figure 3:
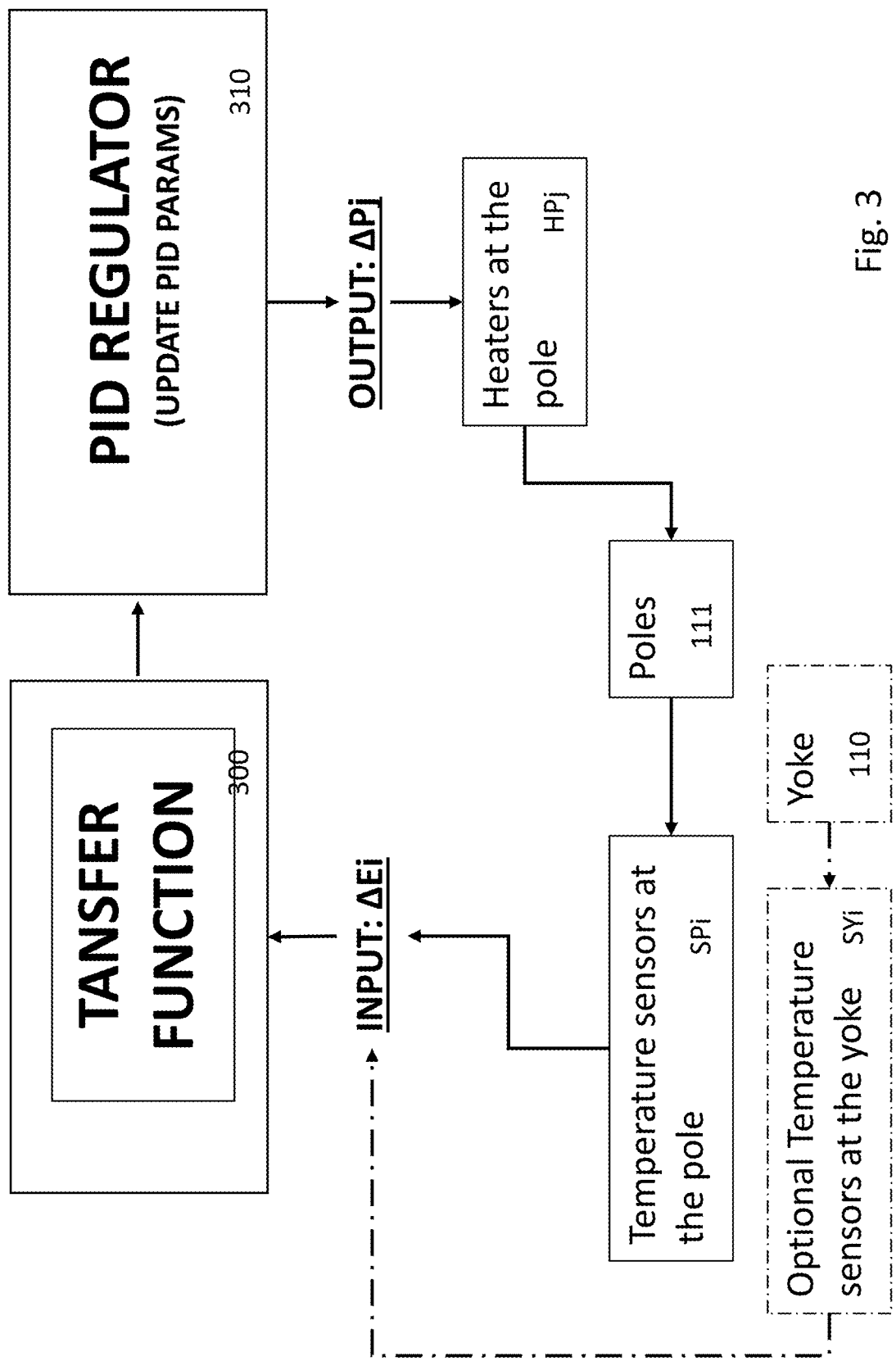
FIG. 3 show a block diagram of an embodiment of a PID controller used for carrying out the thermal control of the poles in the second steady phase of heating and thermal controlling of the poles
Figure 4:
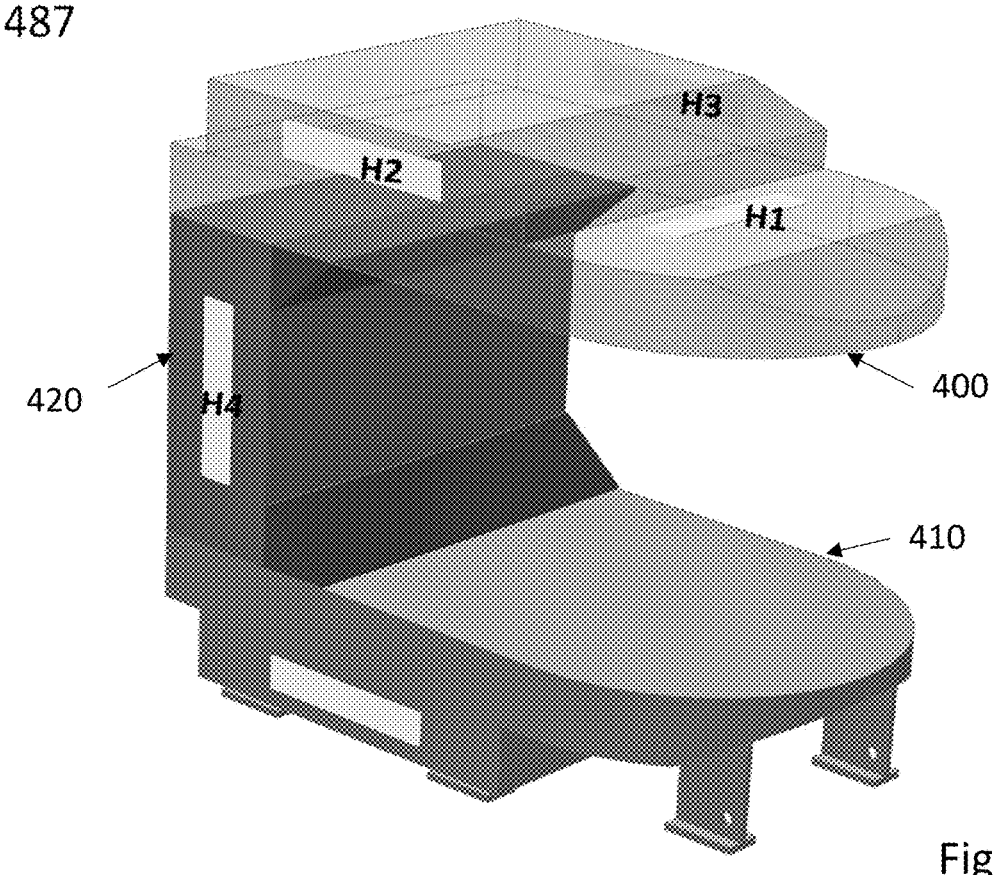
Figure 5:
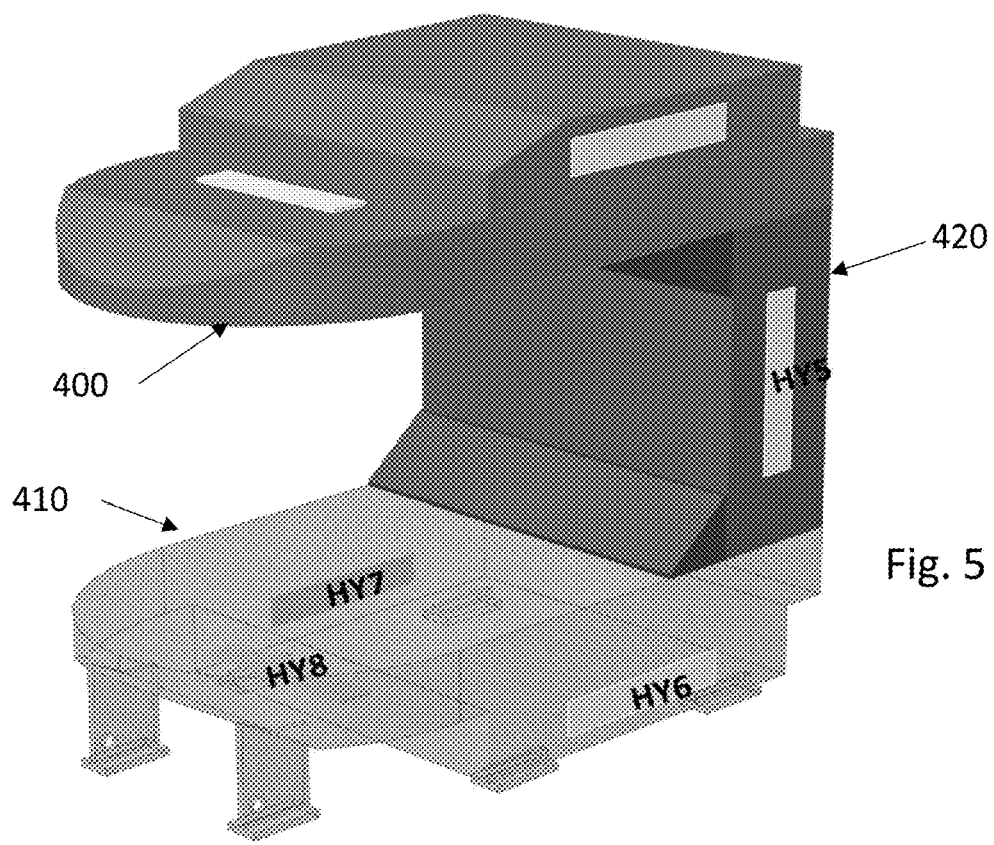

FIG. 3 show a block diagram of an embodiment of a PID controller used for carrying out the thermal control of the poles in the above mentioned second steady phase 220 of heating and thermal control of the poles.

Here the PID control loop for the thermal control of the pole in the above mentioned second thermal control phase 220 is shown for each i-th group of temperature sensors SPi. The control process provides the calculation of an error $\Delta Ei$ which is calculated as the difference of the effectively measured temperature value and the reference value for the working temperature of the poles.

The said measured temperature value corresponds according to the value obtained as a function of the measured temperature values of each of the sensors of the said i-th group, for example a simple average or also a weighted average of the temperature values measured by each temperature sensor of the said i-th group. As indicated by the box having a discontinuous frame the measured temperature value may be calculated also as a function of the measured temperature at a yoke by at least one of the temperature sensors associated to the yoke and indicated by XYi.

For each group of sensors the said error or difference $\Delta Ei$ is fed to a transformation function correlating the said temperature difference $\Delta Ei$ to a difference in the thermal power which is then used for calculating by means of a PID control process the thermal power to be transferred by a certain heater j or by a j—the group of a certain number of heaters to the pole 111. This is indicated by the box Hpj.

In relation to the PID regulator 310, and the transform function 300, the measured values $\Delta Ei$ are transformed in variation of the heat power to supply to the heaters in order to minimize the error or difference $\Delta Ei$.

This transformation is via calculated as a function of the PID control main parameters:

KPi being a proportional constant
KDi being a derivative constant and

KIi being an integrative constant and by the weights $\omega i$ applied to the said KPi, KDi and KIi calculation channels.

Defining the variation of the thermal power to be transferred by each heater of the poles to the corresponding pole as $\Delta Pj$ this value is determined according to the following function:

$$\Delta Pj = f(\Delta Ei, \omega i, KPi, KDi, KIi).$$

FIGS. 4 to 10 show schematic views of a structure of a magnet of an MRI apparatus, particularly the static magnetic field generation structure according to an embodiment and a particular non limiting choice of positioning the temperature sensors and the heaters at the yoke and at the poles.

The FIGS. 4 to 10 represents a shape of the structure which could have a structure as the one schematically shown in FIG. 1, namely of a so-called C-shaped magnetic structure.

The said C-shaped magnet structure comprises an upper and a lower yoke bracket 400 and 410 connected by a vertical plate 420.

Heaters H1 to H3 and H6 to H8 are positioned at different zones of the external surface of the yoke, while heaters H4 and H5 are placed at the side surfaced of the vertical plate.

The above magnetic structure has different symmetries: one according to a symmetry plane which is perpendicular to the opposed surfaces facing each other of brackets 400 and 410 and perpendicular to the frontal side of the vertical plate 420 connecting the two brackets;

Another symmetry plane is oriented parallel to the two opposed sides of the two brackets 400 and 410 ad perpendicular to the frontal side of the vertical plate 420 connecting the two brackets 400 and 410.

The upper bracket 400 has an upper side facing away from the opposite lower bracket 410 and a lower side facing the opposite lower bracket 410. The lower bracket 410 showing a lower side facing from the upper bracket 400 and an upper side facing the upper bracket 400.

Both brackets have lateral perimetral sides extending along the entire perimeter of the upper and the lower sides.

Regarding to the position of the heaters H2 and H3, these heaters are positioned opposed to one another at the lateral sides perpendicular to the vertical plate 420. This positioning is also provided for the heaters H6 and H7 of the lower bracket 410.

On top of the upper side of the upper bracket 400 and below the lower side of the lower bracket 410, at vertically coinciding positions heaters H1 and H8 are placed against the said upper and lower side of the respective bracket 400 and 410 and in a region of the bracket near to the frontal end of the said brackets.

Figure 6:
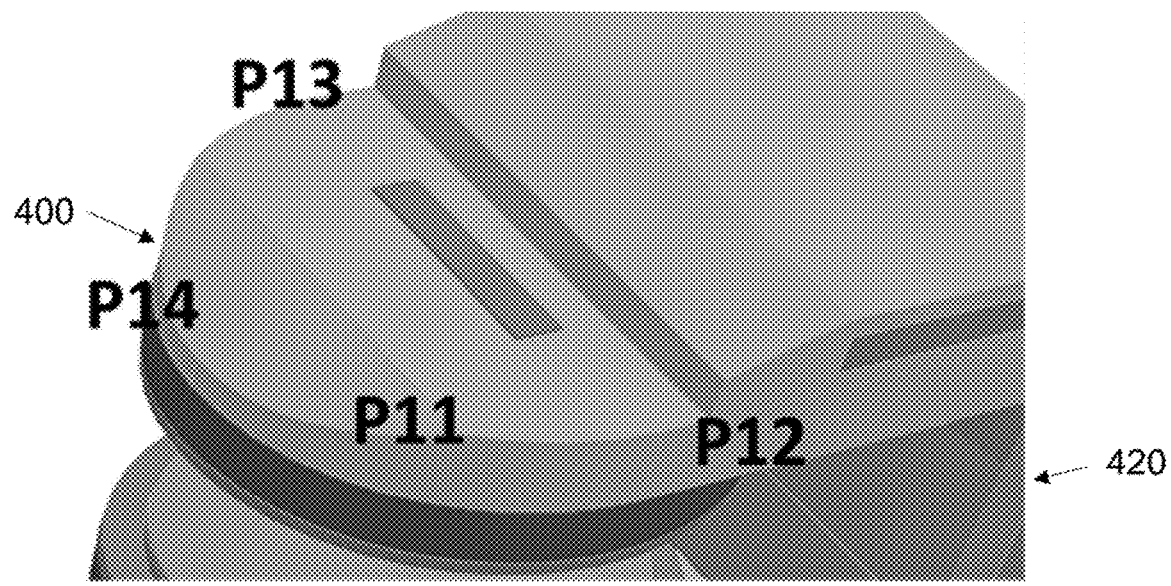
Figure 7:
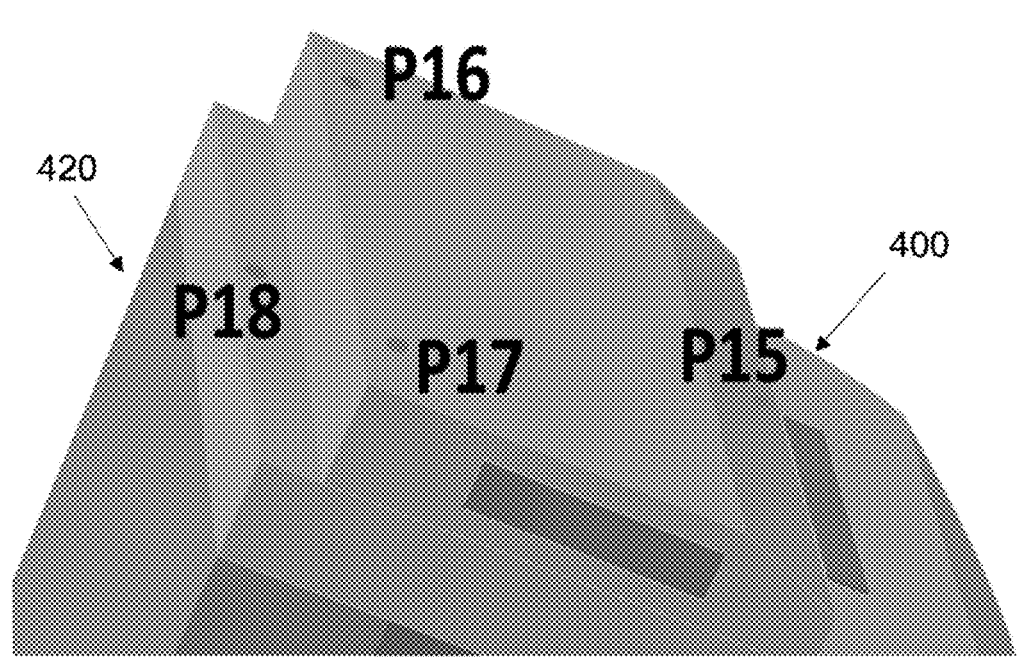

FIGS. 6 and 7 show the positions of the temperature sensors at the surface of the yoke in relation to the geometrical shape of the said yoke described above.

Temperature sensors indicated by P11 to P18 are placed on the surface of the yoke at the upper and at the lower bracket 400 and 410. The position of the sensor P11 to P18 associated to the upper bracket are vertically aligned with the positions of temperature sensors associated to the lower bracket 410 and which are no shown in the figures being the said sensors provided in equal number for both the brackets 400 and 410.

As it appears from the figures, sensors are distributed at the upper surface of the upper bracket 400 and at the lower surface of the lower bracket 410 along the peripheral edge and one sensor being positioned substantially at the centre of the said upper and lower surface of the corresponding bracket, while another sensor being positioned at the middle of the edge of the back side of the upper and lower ends of the vertical plate 420.

Heaters H1 to H8 and temperature sensors P11 to P18 are in thermal conductive contact with the corresponding part of the surface of the yoke to which they are secured.

In combination with the above distribution of heaters and sensors on the yoke, heaters and sensors are also provided at each of the two opposing poles 800 and 810.

According to the present embodiment each pole 800 and 810 comprises at least a pole plate or a combination of one or more overlaid metallic plates having different thickness and made of non-permanently magnetized material indicated respectively with 801 and 811 and which pole plates 801 and 811 are overlaid on the side of one or more layers of permanently magnetized material facing the opposite pole plate and which one or more layers of permanently magnetized material are globally indicated by numerals and 802 and 812.

The combination of overlaid one or more layers of permanently magnetized material are secured to the corresponding bracket 400, 410 at the surface facing the corresponding opposite bracket, and the said pole plate 801, 811 are secured to the said one or more layers of permanently magnetized material 802, 812 facing away from the surface of the bracket to which said one or more layers are secured.

The pole plates 801, 811 have a side with the largest dimension which sides of the two poles are facing each other the said sides being vertically aligned and having identical shape and dimensions and the said sides having a rotational symmetry with reference to an axis perpendicular to the said sides and passing at the centre of the said sides.

Each pole 800, 810 is provided with four heaters HP which are secured in thermal contact with the perimetral lateral surface of the said poles at equal distance one from the other.

Furthermore, each pole 800, 810 is provided with five temperature sensors respectively P1 to P4 and P9, and P5 to P8 and P10 four of which are secured in thermal contact with the pole 800, 810 at the periphery thereof and at equal distance one from the other, the fifth temperature sensor. Respectively P9 and P10 of the upper and the lower poles 800, 810 are positioned at the centre of the corresponding pole.

The positions of the temperature sensors of the lower pole (down pole) 810 are vertically aligned with the positions of the temperature sensors at the upper pole (up pole).

The position of the temperature sensors at the periphery of the poles 800 and 810 are not coincident with the positions of the heaters HP.

Summarizing, the in the above embodiment the heaters configuration is the following:

Eight heaters H1 to H8 on the yoke surface.

The said eight heaters are grouped in two groups of each four heaters comprising the heaters respectively associated to the upper bracket 400 and to the lower bracket 410 and one heater of the two at the lateral sides of the vertical plate 420 connecting the brackets 400 and 410 so to form two heating groups each one being drive by the driving signal of an output channels of two separated output channels for the driving signals of each of the two groups of heaters of the yoke.

The heaters are each one configured to generate and transfer a thermal power such that the total thermal power transferred to the Yoke is of about 1000 to 3000 W, especially 1500 to 200 W.

Four heaters on lateral surfaces of the lower and of the upper poles 800, 810, particularly the corresponding pole plate of non-permanently magnetized material 801 and 811.

Also in this case, the heaters HP of each pole are grouped together and are fed by the driving signal provided at an output channel for the said group of heaters of the thermal controller.

The heaters of the poles are configured so that the total power generated and transferred to the poles is of about 300 to 800 W, especially 400 to 600 W.

In combination with the above configuration a temperature sensor configuration is also provided comprising:

Sixteen sensors on the yoke surface which are grouped together in order to form four groups of sensors each group being associated with a processing channel of the thermal controller Referring to the notation of the above FIGS. 4 to 10 the said groups are defined as follows:

Temperature sensors (P15-P16-P17-P18)=relating to the region of the yoke defined "yoke up rear"*

Temperature sensors (P11, P12, P13, P14)=relating to the region of the yoke defined "yoke up front"*

Temperature sensors (P19-P20-P21-P22)=relating to the region of the yoke defined "yoke down rear"

Temperature sensors (P23, P24, P25, P26)=relating to the region of the yoke defined "yoke down front"

As disclosed above, the temperature sensors (P19-P20-P21-P22) are the one at the lower bracket 410 corresponding to the temperature sensors (P15-P16-P17-P18) at the upper bracket 400 and the temperature sensors P23, P24, P25, P26) are the one at the lower bracket 410 corresponding to the temperature sensors (P11, P12, P13, P14) at the upper bracket 400.

Each group of sensors is connected to a separate processing channel of the thermal controller or is independently processed by a dedicated channel of the thermal controller thanks to feeding of the signals of each group to the processing channel by multiplexing.

Thus according to the present embodiment the index i refers to the channel number 1 to 8 and the index j to the number 1 and 2.

Figure 11:
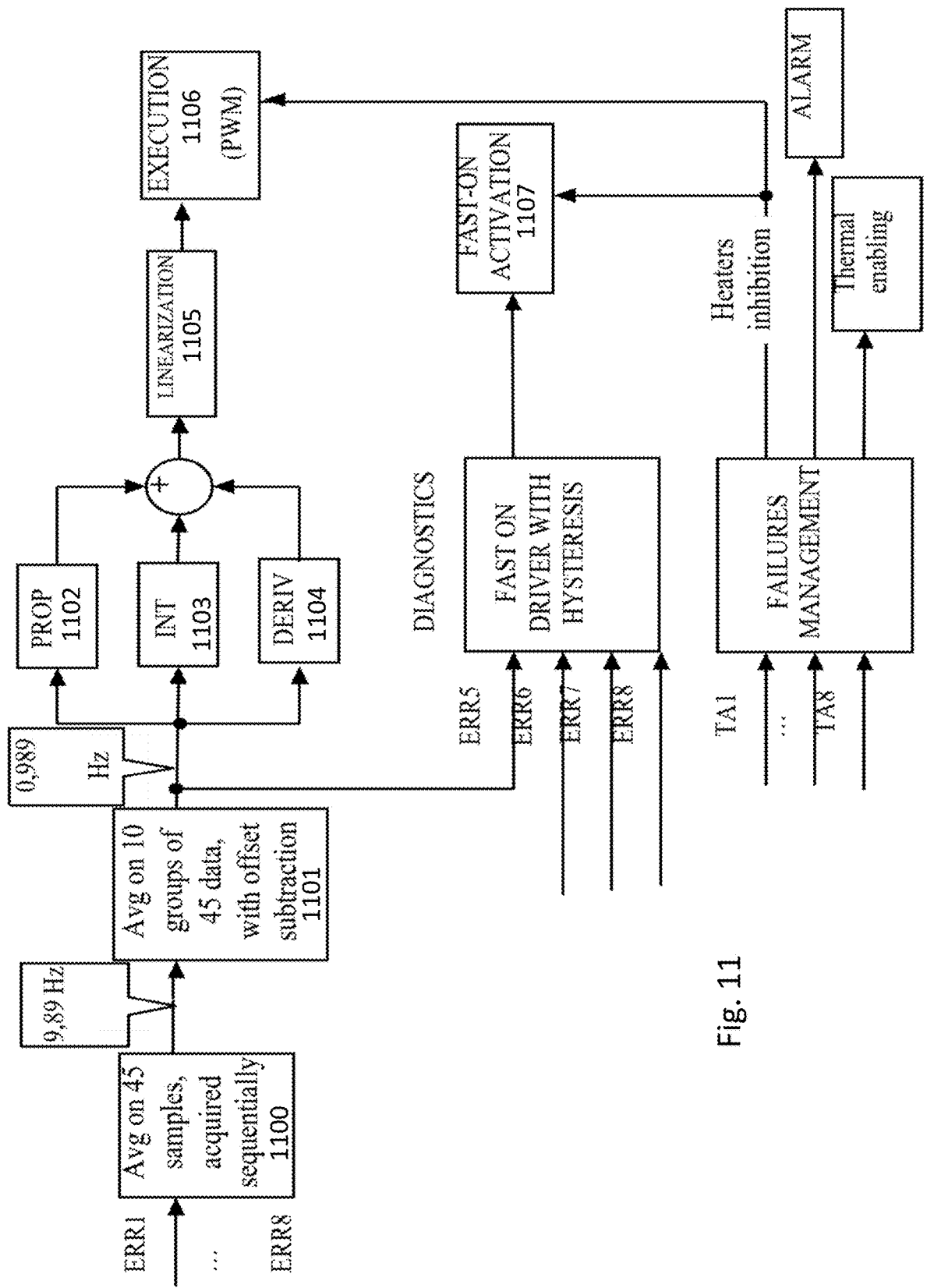
FIG. 11 is a block diagram of the thermal controller specifically configured for carrying out thermal control according to the present invention of a structure for generating a static magnetic field.

FIG. 11 is a block diagram of the thermal controller specifically configured for carrying out thermal control according to the present invention of a structure for generating a static magnetic field according to the embodiments which processed independently the signals relating to measured temperatures generated by eight different groups of temperature sensors and providing driving signals of two different groups of heaters respectively of the pole sand of the yoke.

Thermal and magnetic data are acquired by the AD7888 through the serial SPORT1, in a proper sequence established by the multiplexer. Each data is acquired as unsigned, defined by 12 bits. Six bits are used to define the channel tag.

Channels are identified as shown in the following table:

| Tag | Channel | Define MTCM | Meaning |
|---|---|---|---|
| 0 | DC1 | AD_CHANNEL_TAG_DC1 | Magnetic channel DC1 |
| 1 | DC2 | AD_CHANNEL_TAG_DC2 | Magnetic channel DC2 |
| 2 | AC1 | AD_CHANNEL_TAG_AC1 | Magnetic channel AC1 |
| 3 | AC2 | AD_CHANNEL_TAG_AC2 | Magnetic channel AC2 |
| 4 | AC_PU | AD_CHANNEL_TAG_AC_P_UP | Magnetic channel AC Pick-Up |
| 5 | ERR1 | AD_CHANNEL_TAG_ERR1 | Relative temperature channels (error) |
| 6 | ERR2 | AD_CHANNEL_TAG_ERR2 | |
| 7 | ERR3 | AD_CHANNEL_TAG_ERR3 | |
| 8 | ERR4 | AD_CHANNEL_TAG_ERR4 | |
| 9 | ERR5 | AD_CHANNEL_TAG_ERR5 | |
| 10 | ERR6 | AD_CHANNEL_TAG_ERR6 | |
| 11 | ERR7 | AD_CHANNEL_TAG_ERR7 | |
| 12 | ERR8 | AD_CHANNEL_TAG_ERR8 | |
| 13 | TA1 | AD_CHANNEL_TAG_TA1 | Absolute temperature channels |
| 14 | TA2 | AD_CHANNEL_TAG_TA2 | |
| 15 | TA3 | AD_CHANNEL_TAG_TA3 | |
| 16 | TA4 | AD_CHANNEL_TAG_TA4 | |
| 17 | TA5 | AD_CHANNEL_TAG_TA5 | |
| 18 | TA6 | AD_CHANNEL_TAG_TA6 | |
| 19 | TA7 | AD_CHANNEL_TAG_TA7 | |
| 20 | TA8 | AD_CHANNEL_TAG_TA8 | |
| 21 | PW_SEQ | AD_CHANNEL_TAG_PW_SEQ | Thermal channel of power sequence |
| 22 | ROOM_T | AD_CHANNEL_TAG_ROOM_T | Room temperature channel |

A multiplexer ensures the acquisition and transmission of the above specified channels, in the defined order. Data are organized in group of 6, where the first 5 data come from the magnetic channels (DC1, DC2, AC1, AC2, AC Pick-Up), while the last data comes from the thermal channel. The 18 thermal channels are sampled 45 times before switching to the next channel, therefore groups of 270 following data (6×45) are referred to the same channel. The sequence is repeated every 4860 data (6×45×18).

The acquisition occurs at 48.06 kHz: each magnetic channel is thus sampled at 8.01 kHz. Thermal channels are averaged on 45 consecutive acquisitions, therefore the thermal channel output is changed every 4860 data, i.e. with a frequency of 9.89 Hz.

Once the acquisition and average on the 45 samples from the thermal channels have been completed, the regulation procedure is applied, for each of the ERR1, . . . , ERR8 channels according to the flux diagram of FIG. 11.

At step 1100 the average is calculated on 45 samples of a same channel and which has been acquired sequentially.

At step 1101 the average on the data of ten groups of 45 data, with offset subtraction is carried out;

Each correction applied in closed loop takes only the present channel into consideration, while fast heaters are driven by the simultaneous effect of ERR5, ERR6, ERR7 and ERR8. Alarms can be enabled by TA1, . . . , TA8. The alarm condition also includes the inactivation of the fast heaters. All controls and computations are performed on the ten groups of 45 data. The acquired values, after being averaged, are reported as float, in the range of (−2048, +2048).

ERR1/ERR8 signs are reversed, and their values weighted according to their reliability: signals coming from the lateral (external) sensors on the poles are averaged with a lower coefficient, while the central (internal) sensors of the poles are weighted with a greater coefficient. The reason for this is that the said central sensors being positioned further from the poles heaters, they resent of the heating effect with delay. For the same reason, signals coming from the front sensors of the yoke (both "up" and "down" groups) are weighted with a lower coefficient, while signals coming from the rear side of the yoke (both "up" and "down" groups) are weighted with a greater coefficient.

The proportional block 1102 adds for the i-th channel, at the n-th time lapse the term:

$$P_i^n = K_{PROPi} * Err_i^n;$$

The integrative block 1103 adds for the i-th channel, at the n-th time lapse the term:

$$I_i^n = K_{INTi} * \sum_{m=0}^{m=n} Err_i^m;$$

The algebraic summation accumulates values at each iteration, but a clip is applied (in this implementation) at the double of the acquisition interval;

The derivative block 1104 adds for the i-th channel, at the n-th time lapse the term:

$$D_i^n = K_{DERIVi} * \frac{Err_i^n - Err_i^{n-m}}{T^n - T^{n-m}};$$

where m is chosen in order to have ΔT=10, 11 seconds (ten samples after each average computation).

A further linearization step indicated by 1105 is carried out:

Linearization for the i-th channel, at the n-th time lapse consists in the following operation, performed with a data clip at the interval (0, 4095):

$$RESULT_i^n = \frac{4096}{\sqrt{4096}} * \sqrt{DATA_i^n};$$

According to a feature, a simple proportional controller is preferred when the magnet has substantial dimensions (greater than few ton), since the integrative coefficients would cause oscillations around the working point. The Kp coefficient is different for each channel; for simplicity sake, the i-th term is not specified in the following expressions.

The relationship between proportional coefficient and output power can be obtained from:

The linearization output, which can be written as:

$$\text{Linearization output} = \sqrt{k_P} * \sqrt{Err} * \frac{4096}{\sqrt{4096}} = \sqrt{k_P} * \sqrt{Err} * 64 \quad (1)$$

The transformation applied from the PWM step 1106:

$$\frac{V_{PWM}}{Nlevels} = \frac{V_{MAX}}{4096} \quad (2)$$

where $V_{PWM}$ is the output tension after the PWM gain is applied and N-levels is the temperature error in terms of levels, properly processed by the DSP;

Being Nlevels equal to what reported in the first equation, substituting the (1) in the (2) we obtain:

$$V_{PWM} = \frac{V_{MAX}}{4096} * \sqrt{k_P} * \sqrt{Err} * 64 = \quad (3)$$

$$\frac{144}{4096} * 64 * \sqrt{k_P} * \sqrt{Err} = 2.25 * \sqrt{k_P} * \sqrt{Err}$$

Therefore, the output power is given by:

$$P_{OUT} = \frac{(2.25 * \sqrt{k_P} * \sqrt{Err})^2}{60} = \frac{(2.25^2 * Err * k_P)}{60} \quad (4)$$

From equation (4) it can be observed that the output power is directly proportional to the PID error. Therefore, the contribute of the Kp coefficient must be great enough to compensate for thermal loss of the magnet, but it should not cause the ON/OFF dynamic of the fast heaters, which would mean losing the fine control on temperature.

The parameters to consider for the determination of the proportional coefficient are the magnet mass and the output power.

According to a another further embodiment, fundamental parameter for the determination of the magnet working point is the offset to be added to the temperature errors. An offset of opposite sign can be provided to poles and yoke in order to simulate a wider difference between the control temperature of the poles and the one of the yoke. In this way, the former would work at a higher temperature, the latter at a lower temperature. For instance, giving a −1000 offset to the poles and a +1000 offset to the yoke, the former would work at 30.8° C., the latter at 27.2° C. The use of the offset could also reduce the Kp above indicated.

Fast heaters are enabled when ERR5, ERR6, ERR7 and ERR8 are simultaneously higher than or equal to 767.36 (−0.64° ° C. in respect to the control temperature). Fast heaters turn off when, after their activation, for at least one of the ERR5, ERR6, ERR7 and ERR8 the relative temperature (the error) is lower than 596, 7 (−0.5° C. in respect to the control temperature of the yoke, i.e. the 28° C. The yoke's channels are here taken into account because they would be the ones to first reach the threshold, thanks to their proximity with fast heaters). The difference between the activation and deactivation thresholds (of about 170 levels) is introduced to create a slight hysteresis: in this way, the continuous commutation of the relay can be prevented (from the moment the threshold is overcome to the one of effective temperature achievement of the magnet). The LSB in temperature (used for the determination of the above thresholds in terms of levels) is equal to $8.3752*10^{\wedge}(-4)°$ C.

Fast heaters activation box 1107 is delayed of 10 seconds and, simultaneously, yokes' PWMs are set to minimum (0 V) to avoid over-tensions on the board. The fast heaters deactivation request causes the commutation of a third, additional relay which removes the 220 VAC. At the same time, a 2-seconds interval is waited before changing the fast heaters relays status (i.e. the relays connected to the rest of the circuit). From this commutation, 10 seconds are waited before starting the normal thermal control.

Figure 12:
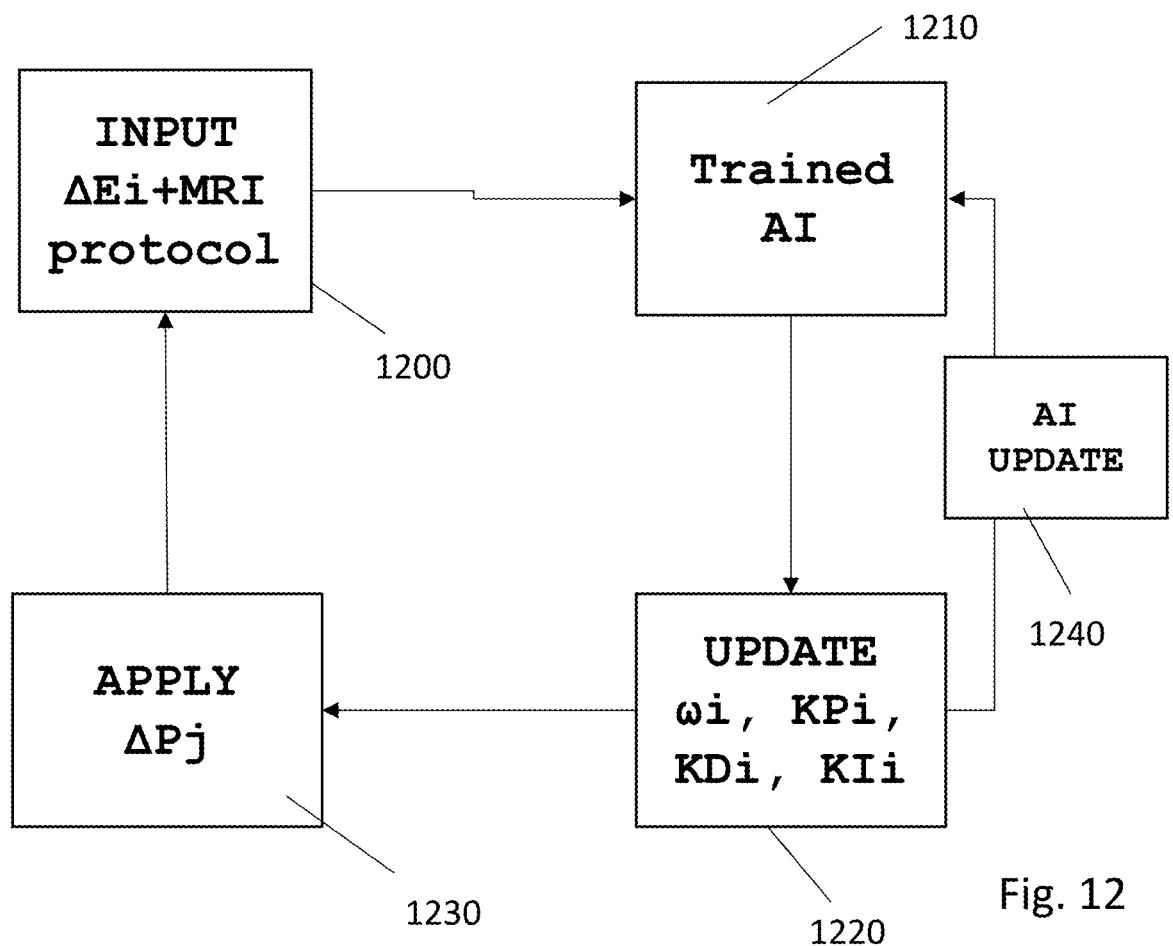
FIG. 12 is a functional block diagram showing the PID process according to the embodiment which takes care also of the thermal energy generated by using different excitation protocols during MRI scanning.

Coming now to FIG. 12, in this figure there are shown the steps for thermal control in combination with the tracking of changes in the variables ωi, KPi, KDi, KIi as a function of time for minimizing in run-time the thermal fluctuations of the central frequency i.e. of the field at the center of the magnet.

As already disclosed the variables ωi, KPi, KDi, KIi defines the energy ΔEi and thus the power ΔPi which is applied to the heaters. These variables may be non constant values as a function of times which is formally described by the equations:

$$\omega i = \omega i(t); Kpi = Kpi(t); KDi = KDi(t) \, e \, KIi = KIi(t).$$

the variation as a function of time of the said variables may occur during the use of the apparatus and thus it is relevant for a correct heat control allowing to provide for an homogenous heating or temperature conditioning of the magnetic structure to consider the said time variations of the values of the said variables.

Typically, the main cause is due to the to the sequences of excitation pulses according to the imaging protocols providing a combination of excitation sequences and which sequences generates thermal energy according to the Joule effect.

Different ways to carry out a thermal control process in run time may be possible.

According to a specific embodiment the time fluctuations of the said variables are parametrized functions of matrices of values which can be updated by using an artificial Intelligence algorithm.

According to the present embodiment, an artificial intelligence algorithm, such as for example a neural network or the like is trained in a supervised or unsupervised way by providing the imaging sequence and the time variation of the said variables so that a specific thermal behavior is mapped. This thermal behavior varies depending on the imaging protocol executed.

According to an embodiment, a method for carrying out thermal control of an MRI system by minimizing run-time the power to be fed to heaters computed according to a PID process, provides for feeding to the system the measured data for the variable sand furthermore the kind of imaging protocol, i.e. the kind of sequence combination used.

A set of training data is acquired which allows to carry out even supervised training. The algorithm may be used then for automatically providing run-time updated variables for carrying out the setting of the variables in relation to time in calculating the corrections data needed to avoid that the system gest into a uncontrolled thermal status.

The flow diagram of FIG. 12 is limited to the already trained algorithm. Training is carried out at the producer. The thermal control unit is delivered in a fully already setup condition.

At step 1200 the control unit receives the data of the measured energy differences ΔEi and the description of the kind of imaging protocol has been used. The said data is fed to the trained algorithm as shown at step 1210. The trained algorithm updates the parameters of the PID equation for calculating the heating power to be fed to the one or more heaters according to the kind of protocol as indicated at step 1220. Step 1230 calculates the power to be fed to the heaters according to the PID function. The effects of the correction may be measured and the used updated data for the variables of the PID function are labeled by a certain fitness. The said data may also be used for updating the AI algorithm if the fitness of the prediction is low.

The machine learning algorithm can be trained in a supervised or un supervised manner on a training dataset comprising input data related to a set of MRI imaging protocols and data related to the corresponding thermodynamic behavior of an MRI system and/or on the time variation of the PID, and the variables $\omega i=\omega i$ (t); $Kpi=Kpi$ (t); $KDi=KDi(t)$ e $KIi=KIi(t)$.

Time variations of the said variables may be mapped over a certain time interval whose duration is about the duration of an MRI imaging with a certain imaging protocol. The curves representing the variation over time of the said variables can be sampled at a certain sampling rate and the data can be organized as vector or a matrix to be fed to the machine learning algorithm.

A non limiting example the machine learning algorithm could be a neural network and a supervised training of said algorithm may be carried out by feeding at the same time the sampled data relating to the time variation of the said variables and the relating protocol.

The invention claimed is:

1. MRI apparatus with an enhanced thermal control system, the said apparatus comprising:
    a static magnetic field generation unit with at least two magnetic poles supported one opposed to the other at a predetermined distance by a yoke and forming a gantry for housing an object to be imaged;
    at least one heater for heating the said magnetic poles and/or the said magnetic yoke;
    one or more temperature sensors measuring the temperature of the at least one pole and/or of the yoke;
    a thermal control unit, comprising:
    a processing unit, with a memory in which a control software is loaded or loadable, the said control software being executed or executable by the said processing unit;
    said processing unit having input ports for receiving the temperature measurement signals from the said one or more temperature sensors;
    said processing unit having output ports for feeding driving signals to the said at least one heater;
    the said control software comprising the instructions for configuring the said processing unit to generate the said driving signals of the said at least one heater as a function of the signals relating to the measured temperature by the said one or more sensors, and in which one or more temperature sensors are associated to each of the poles and to the yoke;
    one or more heaters are associated and in thermal contact to each of the poles and to the yoke,
    in the said control software, the instructions being coded for configuring the said processing unit to carry out two different control phases:
    a first yoke heating phase for heating the yoke at a predetermined working temperature of the yoke;
    a second pole/poles temperature control phase which is started upon reaching of the said working temperature of the yoke by the first yoke heating phase and which second phase provides the driving of the heaters associated to the pole/poles till a predetermined working temperature of the said pole/poles has been reached;
    the said second pole/poles temperature control phase being carried out continuously or steadily during the execution of image acquisitions by the MRI apparatus, while the said yoke heaters are deactivated;
    the said yoke heaters being reactivated if the yoke temperature drops below the said yoke working temperature and till the yoke working temperature has been reestablished.

2. The MRI apparatus according to claim 1, in which said MRI apparatus is a permanent magnet MRI apparatus in which a magnetic field source comprises permanently magnetized material.

3. The MRI apparatus according to claim 1, in which during the said second temperature control phase only the heaters associated to the poles are controlled and activated for reaching and maintaining the said predetermined working temperature of the said poles,
    while the said yoke heaters are deactivated and are reactivated only if the yoke temperature drops below the said working temperature of the yoke and till the yoke temperature has reached again the said yoke working temperature.

4. The MRI apparatus according to claim 1, in which the heaters being in thermal contact with the yoke are fast heaters.

5. The MRI apparatus according to claim 4, in which said one or more heaters are provided in such a number and combination of single heating power that a global heating power of the yoke is generated from 1000 to 3000 W.

6. The MRI apparatus according to claim 1, in which the heaters associated to the poles for the second phase thermal control of the pole/poles are provided in such a number and kind that a global heating power of the pole/s is generated from 300 to 1000 W.

7. The MRI apparatus according to claim 1, in which the yoke and the poles are provided with certain number of heaters distributed over a surface respectively of the said yoke and the said pole/poles and in thermal contact with it at different zones or points of the said surface of the yoke and of the said pole or poles, and
    the yoke and the pole or the poles are provided with a certain number of temperature sensors distributed at different places over the surface of the yoke and of the pole/poles and in thermal contact with it at different zones or points of the yoke and of the poles.

8. The MRI apparatus according to claim 1, in which the said structure for generating the static magnetic field is provided with a construction of the poles and/or of the yoke having one or more symmetries of the shape, the distribution of the heaters and/or of the temperature sensors on the said pole or poles and on the said yoke being defined following the said one or more symmetries of the shape.

9. The MRI apparatus according to claim 1, in which at least a layer of permanently magnetized material is supported by the yoke for one or each of the poles, at least one of the temperature sensors associated to the said yoke is provided near the said layer of permanently magnetized material of the corresponding pole and the output signals related to the corresponding temperature at the yoke measured by the said temperature sensors is also processed by the processing unit during the above mentioned second, steady state, thermal control phase of the pole/poles, in combination with the output signals of the temperature sensors associated and in thermal control with the pole/poles, the processing unit and the control software executed by the said processing unit comprising the instructions for configuring the said processing unit to be able to generate output driving signals for driving the corresponding heaters associated to the poles according to a PID control function ad as a function of the temperature measured by the said temperature sensors associated to the pole/poles and optionally of at least one temperature sensor of the yoke being positioned nearest to the permanently magnetized material.

10. The MRI apparatus according to claim 1, in which the said control software loaded and executed by the said processing unit comprises the instructions for configuring the said processing unit to carrying out recursively the following steps:

the said temperature sensors associated to the poles and optionally the ones associated to the yoke measure the relative temperature differences at different zones of the said poles and at the yoke with respect to the reference temperature being the working temperature of the poles;

the processing unit transforms the said temperature differences in correlated variations of the heat power to be supply to each of the heaters in order to minimize the said temperature differences;

the said transformation from the measured temperature differences in the said power variations of the heating power to be fed to the heaters is carried out by calculating the said power variations for each heater as the function of the said temperature differences measured by the said temperature sensors and of the PID main parameters being: the proportional constant KPi, the derivative constant KDi and the integrative constant KIi and the channel weights ωi according to the following equation:

$$\Delta Pj = f(\Delta Ei, \omega i, KPi, KDi, KIi).$$

11. The MRI apparatus according to claim 1, in which the processing unit is provided with a processing channel for each temperature sensor and with an output channel for each heater and the PID controller carry out the PID control process independently for each of the said temperature sensors and each of the heaters associated to the pole/poles and optionally considering also the temperature measured at the yoke by a temperature sensor at the yoke surface at a zone of point of the yoke which is nearest to the layer of the permanently magnetized material associated to each pole.

12. The MRI apparatus according to claim 1, in which the number of processing channels is reduced by combining together a subgroup of temperature sensors and/or of heaters of the total number of temperature sensors and of the total number of heaters which are associated to the joke yoke and to the pole/poles and assigning the processing of the said group of temperature sensors and/or of heaters to a single processing channel.

13. The MRI apparatus according to claim 1, in which the said control software comprises the instructions for the processing unit to execute a machine learning algorithm which is trained to determine the thermodynamic behavior of an MRI apparatus relatively to the imaging protocol used and which automatically varies in run-time the variables PID, ωi, KPi, KDi, Kii as a function of the time passed during imaging with a certain specific imaging protocol.

14. The MRI apparatus according to claim 13, in which the said control software comprises the instructions for the processing unit to update the training of the machine learning algorithm as a function of the calculated result of obtained by applying the said machine learning algorithm.

15. A method for operating a thermal control of an MRI apparatus comprising a static magnetic field generation unit with at least two magnetic poles supported one opposed to the other at a predetermined distance by a yoke and forming a gantry for housing an object to be imaged, the said method comprising the following steps:

carrying out a fast heating step of the yoke for heating the said yoke to a predetermined working temperature of the yoke;

controlling the heating of the said yoke by measuring the effective temperature of the yoke and stopping the said heating of the yoke when the measured temperature of the yoke corresponds to the said predetermined working temperature of the yoke;

carrying out a following thermal control phase of the pole/poles by monitoring the temperature only of the pole/s and optionally of at least one limited region of the yoke and heating the said poles till the pole/s have reached a predetermined working temperature of the poles;

continuously controlling during operation of the MRI apparatus the heating of the said pole/s by measuring the effective temperature of the pole/s, for maintaining the said working temperature of the pole/poles;

the said heating being controlled by means of a PID control process.

16. The method according to claim 15 in which, during the following thermal control phase, only heaters associated to the pole/s are controlled and activated for reaching and maintaining the said predetermined working temperature of the said pole/s, while the heating of the yoke is stopped and is restarted only if the yoke temperature drops below the said working temperature of the yoke.

17. The method according to claim 15, in which during the following thermal control phase, further to the temperature measured at the pole/poles, also the temperature measured at the at least one limited region of the yoke is used for carrying out the PID control process, driving signals of heaters associated to the pole/poles being calculated by the said PID control process as a function of the temperatures measured at the pole/poles and also at the said at least one limited region of the yoke.

18. The method according to claim 15, in which the temperature of the yoke and/or of the poles is measured at a predetermined number of different zones or points of the said yoke and/or poles, while the yoke and/or the poles are heated at a predetermined number of different zones or points of the said yoke or poles.

19. The method according to claim 18, in which each of measured temperature values at each of the said points or zones or a combination of the said measured values of a certain sub group of the said zones or points at the poles and optionally at the yoke are processed by a separate channel of a PID control loop which generates output channels for setting the heating power to be fed to each of the said zones or points at the poles or to a subgroup for the said zones or points at the poles.

20. The method according to claim 15, in which the said following thermal control phase is configured to carry out recursively the following steps:
one or more temperature sensors associated to the poles and optionally the ones associated to the yoke measure the relative temperature differences at different zones or points of the said poles and at the yoke with respect to the reference temperature being the working temperature of the poles;
a processing unit transforms the said temperature differences in correlated variations of the heat power to be supply to each of the heaters in order to minimize the said temperature differences;
a transformation from the measured temperature differences in the said power variations of the heating power to be fed to the heaters is carried out by calculating the said power variations for each heater as the function of the said temperature differences and of the PID main parameters being: the proportional constant KPi, the derivative constant KDi and the integrative constant KIi and the channel weights ωi according to the following equation:

$$\Delta Pj = f(\Delta Ei, \omega i, KPi, KDi, KIi).$$

21. The method according to claim 18, in which the variables PID, ωi, KPi, KDi, KIi are updated run-time as a function of time passed in relation to a start of an imaging process and as a function of a specific imaging protocol applied for the imaging process.

22. The method according to claim 21, in which the time dependence of the variables PID, ωi, KPi, KDi, KIi and the values of the said variables at an instant falling within a start and an end of an execution of a certain imaging protocol are calculated by means of a trained machine learning algorithm,
the training being carried out in a supervised or unsupervised manner by using a training data set comprising a set of imaging protocols and the measured data of the thermodynamic behavior of an MRI apparatus executing the said imaging protocols.

* * * * *